Aug. 7, 1962 R. O. SCHILDKNECHT 3,048,661
MULTIPLEX COMMUNICATION RECEIVER
Filed Dec. 11, 1958
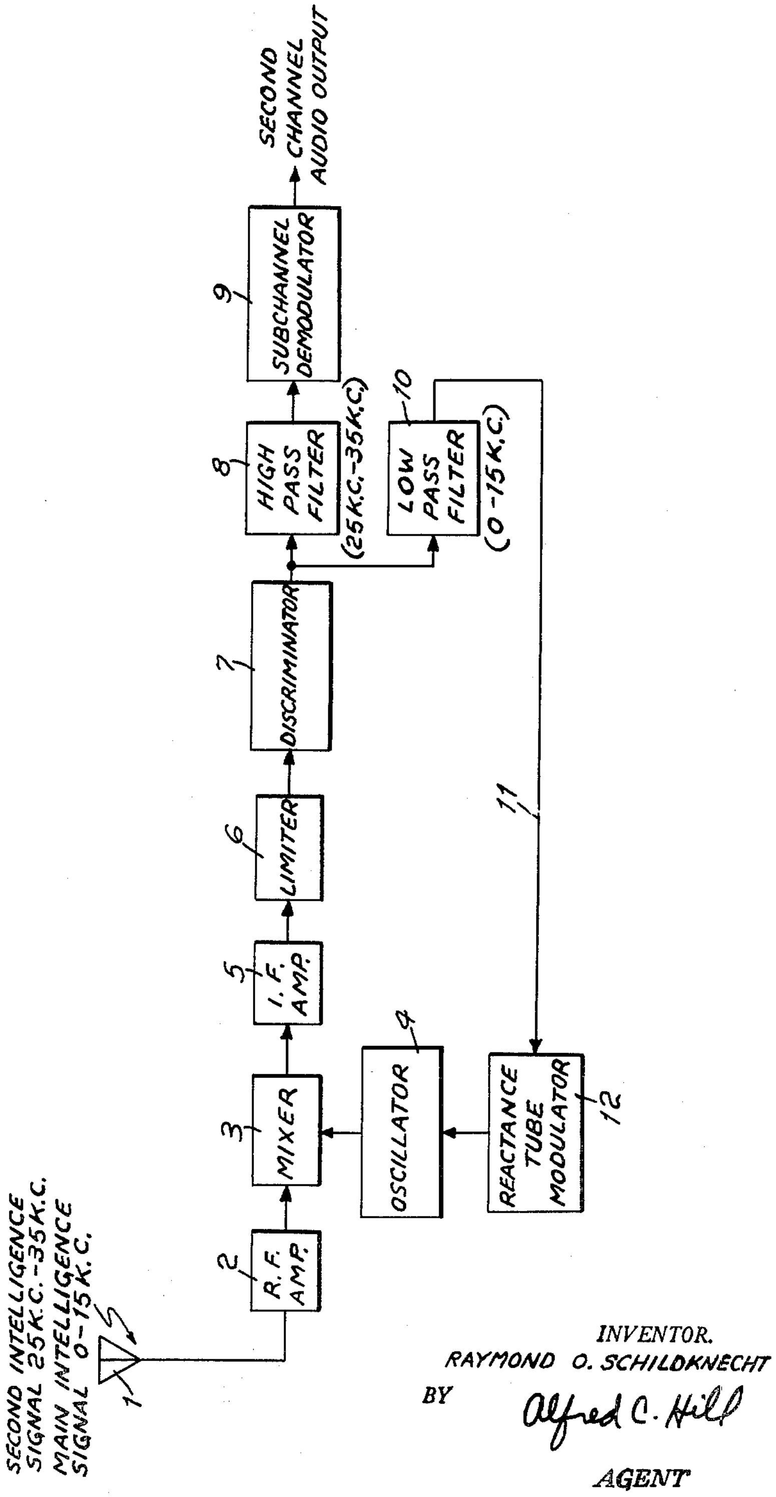
INVENTOR.
RAYMOND O. SCHILDKNECHT
BY Alfred C. Hill
AGENT 3,048,661
MULTIPLEX COMMUNICATION RECEIVER
Raymond O. Schildknecht, Clifton, N.J., assignor to International Telephone and Telegraph Corporation, Nutley, N.J., a corporation of Maryland
Filed Dec. 11, 1958, Ser. No. 779,743
11 Claims. (Cl. 179—15)

This invention relates to multiplex communication systems and more particularly to a multiplex communication receiver for employment in a particular type of multiplex communication systems.

Generally, the communication system to which this invention is applicable is that multiplex communication systems utilizing existing angularly modulated broadcast transmitters for the purpose of simultaneously transmitting one or more auxiliary signals, such as subscription programs, or other intelligence to a specific audience or selected receiving points employing special multiplex receiving apparatus of which the receiver of this invention is an improved form. The multiplexing of the subscription or special intelligence with the regular broadcast is accomplished without causing interference with the regular broadcasts. It should be remembered that the techniques described herein may be employed in stereophonic type broadcasts.

The invention is especially applicable in the FM (frequency modulation) or television broadcast field as it provides a means whereby multiple transmission of audio programs or other intelligence may be achieved with a minimum of equipment modification, engineering or other installation expense at an FM or other television broadcast station and therefore is readily adaptable to any type of FM broadcast transmitter including the FM audio transmitters associated with television stations now in general service throughout the world.

The multiplex communication system in which the receiver of this invention can be employed has become known as an FM-FM type multiplex system. However, it is to be understood that this technique can be employed in any type of angularly modulated communication system including phase modulated signals. The FM-FM type system has become the most popular due to the fact that FM broadcast stations are readily available to which the additional channels may be added to their main program emanating therefrom. Further, an FM broadcast signal may be phase modulated by the auxiliary channels as well as frequency modulated as hereindescribed for purposes of illustration. In addition, it should be pointed out that the auxiliary intelligence signals may amplitude modulate or phase modulate the sub-carrier as well as the FM sub-carrier as described herein. The receiver will be described with respect to the FM-FM type system but the above alternatives should be kept in mind.

The technique for transmitting the FM-FM multiplex broadcast signal is known in the art. Examples of the techniques and equipment employed to transmit the FM-FM multiplexed signals may be found in articles in technical literature, the following two being examples thereof: J. H. Bose, "Multiplexing FM Broadcast Transmitters," Electronics, October 1955, pages 146 to 150 and W. N. Hershfield, "Multiprogram FM Broadcast System," Electronics, June 1956, pages 130 to 133. The FM-FM broadcast multiplexing communication system provides at least one and possibly a plurality of channels on an otherwise conventional FM broadcast signal whereby the additional channels may be employed for point-to-point service, such as background music in stores and offices, and which may be used in multiplex radio relay broadcasting systems for taxi dispatching and police radio, and so forth. The techniques may be also employed to provide stereophonic programs. The requirement is that the multiplexed channel or channels not be detected by the general public receiving the conventional broadcast signal nor should the multiplexed channel interfere with the conventional reception of the main program. One technique employed at the transmitter is to angularly or frequency modulate an oscillator signal by a first intelligence signal (usually the normal broadcast signal). The modulated oscillator signal is then multipled to a suitable frequency level. This resultant signal is then modulated by at least one sub-carrier frequency which has been angularly or frequency modulated by a second intelligence signal (the auxiliary channel signal). The multiplexed signals are then acted upon by further multipliers to raise the carrier frequency to a radio frequency level, say in the order of 90 megacycles. The ultrasonic subcarrier angularly (frequency) modulated by the second intelligence signal is transmitted by a rather low deviation of the main carrier, in the order of 10 percent of the total deviation.

The weakness of the existing systems for FM-FM multiplexing of the type hereindescribed is in the receiver where the comparatively large frequency excursions or deviations due to the main program give rise to various distortion products in the intermediate frequency (IF) amplifiers, limiters and discriminator stages. These distortion products tend to produce serious interference in the multiplexed channels and cannot be removed by post-detection filtering. This problem has been fully described by the pioneers in the FM-FM system of multiplex broadcasting, such as Major Armstrong, the discoverer of the FM-FM mulitplex techniques. This distortion above described is presently being reduced by imposing severe requirements on the IF amplifier and discriminator linearity plus other elaborate precautions. The results achieved are still not completely satisfactory. Additionally, considerable post-detection filtering is required to separate channels as a result of the much higher level (amplitude) of the main program intelligence signal.

An object of this invention is to provide an improved receiver for use in an FM-FM multiplex type communication system.

Another object of this invention is the provision of a receiver for utilization with the FM-FM type multiplex communication system which is relatively inexpensive and relatively simple in comparison with the prior art receivers employed with this type of multiplex system.

Still another object of this invention is to provide an arrangement to reduce the interfering capability of the main program intelligence signal by diminishing the deviation of the carrier frequency signal in the receiver through the use of "frequency-following" techniques.

A feature of this invention is the provision of a receiver which will respond to the multiplex signals which include a radio frequency carrier angularly modulated by a first intelligence signal and at least one radio frequency sub-carrier modulated such as by angular or amplitude, by a second intelligence signal. The receiver incorporates a means to recover from the multiplex signal the second intelligence signal, a means responsive to the multiplex signal to detect said first intelligence signal and a means coupled to the output of the means to detect the first intelligence signal to reduce the angular modulation of the carrier signal at the input of the means to recover said first intelligence signal.

Another feature of this invention includes the incorporation of a feedback path employing a low-pass filter to couple the first intelligence signal modulation derived from the output of the receiver discriminator to an electronically variable frequency local oscillator so as to reduce the original wide band deviation of the main or first intelligence signal on the carrier to a relatively narrow band angularly modulated signal.

The above-mentioned and other features and objects of this invention will become more apparent by reference to the following description taken in conjunction with the accompanying drawing, the single FIGURE of which illustrates in block form a schematic diagram of a receiver in accordance with the principles of my invention.

Referring to the FIGURE of this application, the receiver following the principles of my invention is illustrated. The receiver responds to the FM-FM multiplex signal which may be produced at an usual FM broadcasting station by incorporating for example, the techniques disclosed fully in the above-identified articles. Briefly, the signal received by the receiver of this invention may for example, be produced by modulating the output of an oscillator with a main or first intelligence signal source which may be an audio signal in the range of 0 to 15 kc. This may result in a relatively wide deviation of the oscillator signal in the order of ±7.5 kc. This modulated signal is then multiplied to a given frequency level, said multiplication also increasing the deviation of the oscillator signal. In another portion of the transmitter, a sub-carrier frequency, say 30 kc., is frequency modulated by a second intelligence signal, the signal for which subscribers pay a fee. This frequency or phase modulated sub-carrier frequency then modulates the multiplied modulated oscillator signal by a low level deviation thereof. This superimposed sub-carrier upon the main carrier of the FM broadcasting station is then further multiplied along with the main broadcasting station to a desired carrier frequency, say in the order of 90 megacycles. In this arrangement the main signal modulation will be in the transmission frequency spectrum of say from 0 to 15 kc., while the second channel intelligence will be in a frequency spectrum removed from and higher than the main channel intelligence. For instance, it may be in the frequency spectrum of 25 to 35 kc. since a 30 kc. sub-carrier was employed herein as an example. Thus, on a frequency spectrum basis the main channel intelligence is in the lower part of the transmission spectrum and the second channel or subscription channel is in the high frequency portion of the spectrum.

The radio frequency carrier modulated in accordance with the techniques above-outlined is received on an antenna 1 and coupled to radio frequency amplifier 2 for application to mixer 3. The frequency output of oscillator 4 is applied to mixer 3. Mixer 3 operates in a well-known manner on the radio frequency signal and the oscillator signal to produce an intermediate frequency signal angularly modulated in accordance with the first and second intelligence signals which is applied to IF amplifier 5 and hence to limiters 6 and discriminator 7 in the usual manner for FM receivers. The output signal of discriminator 7 is the intelligence signal carried to the receiver by the radio frequency carrier. In the instant case the modulation at the output of discriminator 7 is in effect at least two modulation or intelligence signals, each at different frequency levels as pointed out hereinabove. Namely, the intelligence or broadcast signal is in the frequency range of 0 to 15 kc. and the second intelligence signal is in the frequency range of 25 to 35 kc. in the example employed herein. The second intelligence signal, which is the auxiliary signal or program or other special intelligence signals pointed out hereinbelow in connection with radio relaying, is picked off by high-pass filter 8 which, in the example employed, passes the frequency range of from 25 to 35 kc. or, in other words, will pass the second intelligence signal which appears above 25 kc. The output of high-pass filter 8 is then sent to the subchannel demodulator 9 from which the second audio output can be coupled to a utilization device. If the sub-carrier is FM modulated, demodulator 9 will be an FM demodulator. However, if the subcarrier is AM modulated, demodulator 9 will be an AM demodulator.

As pointed out hereinabove, certain distortion products produced in the IF amplifier, limiter and the discriminator stage accrues from the main signal or first signal source frequency excursions of the carrier signal. These distortion products tend to produce serious interference in the wanted or second intelligence signal and cannot be removed by post-detection filtering. Hence, in accordance with the teachings of this invention, I provide a low-pass filter 10 coupled to the output of discriminator 7 which permits the passage of only the first intelligence signal. This first intelligence signal is passed through low-pass filter 10 and along a feedback conductor 11 to reactance tube modulator 12 which electronically varies the frequency output of local oscillator 4 in a well-known manner. This variation of the frequency of local oscillator 4 is proportional to the modulation of the first signal intelligence but with opposite polarity so as to oppose or reduce the original wide band deviation of the carrier produced by the first intelligence signal and thereby reduce the main program signal or first intelligence source to a narrow band FM. This will thereby substantially eliminate distortion between the main program signal and the second program signal or intelligence signal. Since the low-pass filter 10 is employed in the feedback loop, the second intelligence retains its original deviation or modulation which is now comparable to or greater than the remaining deviation of the carrier by the first intelligence signal. This ratio of second source deviation to first source deviation can be increased to any desired amount limited only by stability considerations around the feedback loop and by residual noise.

Several other advantages accrue to this arrangement, especially where the receiver is to be used only for second intelligence signal reception. The receiver can, of course, be of more inexpensive design for a given quality. The IF stages need not be wide band thereby reducing the complexity. Most important is the fact that the receiver will function with reduced threshold effect and improved signal-to-noise ratio on the second intelligence signal or at greater distance for a given signal-to-noise ratio.

While I have described above the principles of my invention in connection with specific apparatus, it is to be clearly understood that this description is made only by way of example and not as a limitation to the scope of my invention as set forth in the objects thereof and in the accompanying claims.

I claim:

1. A multiplex communication receiver comprising a source of multiplex signals including a radio frequency carrier angularly modulated by a first intelligence signal and at least one radio frequency sub-carrier modulated by a second intelligence signal, means coupled to the output of said source to recover from said multiplex signals said second intelligence signal, means coupled to the output of said source to detect said first intelligence signal, and means coupled to said source and the output of said last-mentioned means to reduce the angular modulation of said carrier by said first intelligence signal with respect to the angular modulation of said carrier by said sub-carrier.

2. A multiplex communication receiver comprising a source of multiplex signals including a radio frequency carrier frequency modulated by a first intelligence signal and at least one radio frequency sub-carrier modulated by a second intelligence signal, means coupled to the output of said source to recover from said multiplex signal said second intelligence signal, means coupled to the output of said source to detect said first intelligence signal, and means coupled to said source and the output of said last-mentioned means to reduce the frequency modulation of said carrier by said first intelligence signal with respect to the frequency modulation of said carrier by said sub-carrier.

3. A multiplex communication receiver for receiving signals from a source of multiplex signals including a radio frequency carrier angularly modulated by a first intelligence signal and at least one radio frequency sub-carrier modulated by a second intelligence signal comprising means responsive to said multiplex signals to recover said second intelligence signal, means responsive to said multiplex signals to detect said first intelligence signal, and means responsive to said detected first intelligence signal to reduce the angular modulation of said carrier frequency by said first intelligence signal with respect to the angular modulation of said carrier by said sub-carrier prior to action thereon by said means to recover said second intelligence signal.

4. A multiplex communication receiver comprising a source of multiplex signals including a radio frequency carrier angularly modulated by a first intelligence signal and at least one radio frequency sub-carrier modulated by a second intelligence signal, a heterodyning circuit coupled to said source to produce an intermediate frequency signal modulated in accordance with said first intelligence signal and said sub-carrier modulated by said second intelligence signal, means coupled to the output of said heterodyning means to recover said second intelligence signal, means coupled to the output of said heterodyning circuit to detect said first intelligence signal, and means coupled to said means to detect said first intelligence signal and responsive to said first intelligence signal to adjust the modulation of said intermediate frequency signal by said first intelligence signal to reduce the angular modulation of said intermediate frequency signal by said first intelligence signal with respect to the angular modulation of said intermediate frequency signal by said sub-carrier.

5. A multiplex communication receiver for receiving signals from a source of multiplex signals including a radio frequency carrier angularly modulated by a first intelligence signal and at least one radio frequency sub-carrier modulated by a second intelligence signal comprising a heterodyning circuit to produce an intermediate frequency signal modulated in accordance with said first intelligence signal and said sub-carrier modulated by said second intelligence signal from said carrier frequency, means coupled to the output of said heterodyning means to recover said second intelligence signal, means coupled to the output of said heterodyning means to detect said first intelligence signal, and means coupled to said means to detect said first intelligence signal and responsive to said first intelligence signal to adjust the modulation of said intermediate frequency by said first intelligence signal to reduce the angular modulation of said intermediate frequency signal with respect to the angular modulation of said intermediate frequency signal by said sub-carrier by said first intelligence signal.

6. A multiplex communication receiver comprising a source of multiplex signals including a radio frequency carrier angularly modulated by a first intelligence signal and at least one radio frequency sub-carrier modulated by a second intelligence signal, a mixer circuit coupled to said source, a variable frequency oscillator coupled to said mixer circuit to produce an intermediate frequency signal, means coupled to the output of said mixer to recover said second intelligence signal, means coupled to the output of said mixer to detect said first intelligence signal, and means coupled to said means to detect said first intelligence signal and responsive to said first intelligence signal to adjust the frequency of said variable frequency oscillator to reduce the angular modulation of said carrier by said first intelligence signal with respect to the angular modulation of said carrier by said sub-carrier.

7. A multiplex communication receiver for receiving signals from a source of multiplex signals including a radio frequency carrier angularly modulated by a first intelligence signal and at least one radio frequency sub-carrier modulated by a second intelligence signal comprising a mixer circuit responsive to said multiplex signals, a variable frequency oscillator coupled to said mixer circuit to produce an intermediate frequency signal, means coupled to the output of said mixer to recover said second intelligence signal, means coupled to the output of said mixer to detect said first intelligence signal, and means coupled to said means to detect said first intelligence signal and responsive to said first intelligence signal to adjust the frequency of said variable frequency oscillator to reduce the angular modulation of said carrier by said first intelligence signal with respect to the angular modulation of said carrier by said sub-carrier.

8. A multiplex communication receiver comprising a source of multiplex signals including a radio frequency carrier angularly modulated by a first intelligence signal and at least one radio frequency sub-carrier modulated by a second intelligence signal, said sub-carrier frequency being disposed with respect to the modulation band of said first intelligence signal to space the modulation band of said second intelligence signal in a higher portion of the transmission frequency spectrum, a mixer circuit coupled to said source, a variable frequency oscillator coupled to said mixer circuit to produce an intermediate frequency signal, a discriminator coupled to the output of said mixer to detect the modulation of said first intelligence signal and said sub-carrier modulated by said second intelligence signal, a high-pass filter coupled to the output of said discriminator to pass only said modulated sub-carrier for utilization of said second intelligence signal, a low-pass filter coupled to the output of said discriminator to pass only the modulation of said first intelligence signal, and means to couple the output of said low-pass filter to said variable frequency oscillator to adjust the frequency of said variable frequency oscillator to reduce the angular modulation of said carrier by said first intelligence signal with respect to the angular modulation of said carrier by said sub-carrier.

9. A multiplex communication receiver for receiving signals from a source of multiplex signals including a radio frequency carrier angularly modulated by a first intelligence signal and at least one radio frequency sub-carrier modulated by a second intelligence signal, said sub-carrier frequency being disposed with respect to the modulation band of said first intelligence signal to space the modulation band of said second intelligence signal in a higher portion of the transmission frequency spectrum, comprising a mixer circuit responsive to said multiplex signals, a variable frequency oscillator coupled to said mixer circuit to produce an intermediate frequency signal, a discriminator coupled to the output of said mixer to recover the modulation of said first intelligence signal and sub-carrier modulated by said second intelligence signal from said intermediate frequency signal, a high-pass filter coupled to the output of said discriminator to pass said sub-carrier and the modulation of said second intelligence signal therethrough for utilization of said second intelligence signal, a low-pass filter coupled to the output of said discriminator to pass therethrough the modulation of said first intelligence signal, and means coupled to the output of said low-pass filter to couple the modulation of said first intelligence signal to said variable frequency oscillator to adjust the frequency of said variable frequency oscillator to reduce the angular modulation of said carrier by said first intelligence signal with respect to the angular modulation of said carrier by said sub-carrier.

10. A multiplex communication receiver comprising a source of multiplex signals including a radio frequency carrier angularly modulated by a first intelligence signal and at least one radio frequency sub-carrier modulated by a second intelligence signal, a mixer circuit coupled to said source, a variable frequency oscillator coupled to said mixer circuit to produce an intermediate frequency signal, means coupled to the output of said mixer to recover said second intelligence signal, means coupled to the output of said mixer to detect said first intelligence signal and a feedback path coupled between said detector means and said variable frequency oscillator, said feedback means responding to said first intelligence signal to adjust the frequency of said variable frequency oscillator to reduce the angular modulation of said carrier by said first intelligence signal with respect to the angular modulation of said carrier by said sub-carrier.

11. A multiplex communication receiver for receiving a source of multiplex signals including a radio frequency carrier angularly modulated by a first intelligence signal and at least one radio frequency sub-carrier modulated by a second intelligence signal comprising a mixer circuit responsive to said multiplex signals, a variable frequency oscillator coupled to said mixer circuit to produce an intermediate frequency signal, means coupled to the output of said mixer to recover said second intelligence signal, means coupled to the output of said mixer to detect said first intelligence signal and a feedback means coupled between the output of said detector means and said variable frequency oscillator, said feedback means coupling said first intelligence signal to said variable frequency oscillator to adjust the frequency of said variable frequency oscillator to reduce the angular modulation of said carrier by said first intelligence signal with respect to the angular modulation of said carrier by said sub-carrier.

References Cited in the file of this patent

UNITED STATES PATENTS

| | | |
|---|---|---|
| 2,282,973 | Koch | May 12, 1942 |
| 2,544,311 | Gottier | Mar. 6, 1951 |
| 2,553,368 | Green | May 15, 1951 |
| 2,709,254 | Halstead | May 24, 1955 |
| 2,790,848 | Koch | Apr. 30, 1957 |
| 2,831,916 | Dome | Apr. 22, 1958 |
| 2,855,506 | Schabauer | Oct. 7, 1958 |
| 2,906,866 | Thompson | Sept. 29, 1959 |
| 2,955,199 | Mindes | Oct. 4, 1960 |